United States Patent [19]
Adachi et al.

[11] Patent Number: 5,342,528
[45] Date of Patent: Aug. 30, 1994

[54] WATER-PURIFYING MATERIAL, A PROCESS FOR MANUFACTURING THE SAME AND A PROCESS FOR PURIFYING WATER

[75] Inventors: Kiyoshi Adachi, Kóbe; Yasuaki Uda, Nara; Masayuki Suzuki, Kizu, all of Japan

[73] Assignee: Takeda Chemical Industries, Ltd., Osaka, Japan

[21] Appl. No.: 41,186

[22] Filed: Apr. 1, 1993

[30] Foreign Application Priority Data

Apr. 9, 1992 [JP] Japan ................. 4-088789

[51] Int. Cl.$^5$ ............................ C02F 1/28; C02F 1/50
[52] U.S. Cl. ....................... 210/668; 210/694; 210/764; 210/501; 210/502.1; 502/411; 502/417
[58] Field of Search .............. 502/183, 184, 417, 416, 502/410, 251, 411, 7, 414, 415; 422/19, 28; 210/764, 501, 502.1, 763, 694, 663, 679, 668

[56] References Cited

U.S. PATENT DOCUMENTS

| | | | |
|---|---|---|---|
| 1,519,470 | 12/1924 | Wilson | 502/417 |
| 1,520,437 | 12/1924 | Pipkin | 502/183 |
| 1,535,798 | 4/1925 | Wickenden | 502/417 |
| 2,040,806 | 5/1936 | Feigl | 210/501 |
| 2,448,337 | 8/1948 | Wickenden | 502/417 |
| 2,470,688 | 5/1949 | Carter | 502/183 |
| 2,481,300 | 9/1949 | Engel | 502/183 |
| 3,294,572 | 12/1966 | Piccione et al. | 502/184 |
| 3,872,013 | 3/1975 | Nishino et al. | 210/501 |
| 4,092,245 | 5/1978 | Franks et al. | 210/501 |
| 4,111,842 | 9/1978 | van Montfoort | 252/447 |
| 4,603,119 | 7/1986 | Karl et al. | 502/417 |
| 4,608,247 | 8/1986 | Heinig, Jr. | 210/501 |
| 5,017,295 | 5/1991 | Antelman | 210/764 |
| 5,089,275 | 2/1992 | Antelman | 210/764 |
| 5,118,655 | 6/1992 | Pedersen | 210/679 |

FOREIGN PATENT DOCUMENTS

49-61950 6/1974 Japan.
56-158184 12/1981 Japan.
59-193134 11/1984 Japan.

*Primary Examiner*—Cynthia L. Nessler
*Attorney, Agent, or Firm*—Wenderoth, Lind & Ponack

[57] ABSTRACT

A water purifying material containing (1) an activated carbon having (a) silver and/or an inorganic silver compound and (b) a water soluble alkaline earth metal salt supported thereon and (2) a bone-char, which can significantly inhibit the dissolution of silver and can be used for a long period of time.

12 Claims, No Drawings

WATER-PURIFYING MATERIAL, A PROCESS FOR MANUFACTURING THE SAME AND A PROCESS FOR PURIFYING WATER

BACKGROUND OF THE INVENTION

1. Field of the Invention

The present invention relates to a water purifying material using an activated carbon, a process for manufacturing the same and a process for purifying water.

2. Description of the Prior Art

In recent years, water purifiers using activated carbon have been marketed and widely used for removal of chlorine and malodorous substances as well as harmful organic substances from tap water. However, when water running in the water purifier is stopped, there is no chlorine in the device whereby microorganisms were propagated therein causing a hygienic problem.

Japanese Laid Open Application Sho 49/61950-A describes that when a silver or silver compound is supported on the activated carbon in the water purifier, propagation of bacteria in the water purifier can be inhibited. Also Japanese Laid Open Application Sho 56/158184-A discloses a preservative for drinks, which comprises activated carbon having silver supported thereon and coral sand. In these cases, however, the drinking water after passing through the above purifier contains a notable amount of silver which is not desired for health reasons.

In Japanese Laid Open Application Sho 59/193134-A, there is a proposal on water purifying material to which inorganic components such as bone-char, sepiolite, etc. are added so that the dissolution of silver into drinking water obtained after passing through the purifier can be prevented. However, when bone-char or sepiolite in an amount sufficient for inhibiting dissolution of silver into drinking water is added to activated carbon, there is another problem that the water purifying effect is rather lowered because bone-char and sepiolite have nearly no activity of removing chlorine, etc. as well as harmful organic substances.

SUMMARY OF THE INVENTION

The present inventors have conducted various investigations in solving these problems and found that, when water soluble alkaline earth metal salt is made present with silver-supported activated carbon, dissolution of silver can be prevented.

Thus, the present invention provides a water purifying material comprising (1) an activated carbon having (a) silver and/or an inorganic silver compound and (b) a water soluble alkaline earth metal salt supported thereon and (2) a bone-char.

Also, it provides a process for manufacturing the above water-purifying material which comprises supporting a silver and/or inorganic silver compound and a water soluble alkaline earth metal salt on the activated carbon and mixing the resulting activated carbon with bone-char.

Further, it provides a process for purifying water which comprises contacting the above water-purifying material with water.

The above-mentioned activated carbon is prepared by supporting the silver or inorganic silver compound and the water soluble alkaline earth metal on activated carbon.

PREFERRED EMBODIMENT

The activated carbon used here is that manufactured by a known method starting, for example, from coal, coke, charcoal, coconut shell, resin or animal bone, and any of them may be used so far as its specific surface area is 100–2,000 $m^2/g$. The shape may be any of spheres, columns, crushed shape, powder, granules, fibrous shape, etc., among which powdery or crushed shape is preferred.

Examples of the silver are silver metal, colloidal silver and silver ion. Examples of the inorganic silver compounds are silver halide (e.g. silver chloride, silver bromide and silver iodide ), silver nitrate, silver sulfate, silver phosphate, silver sulfide, silver chlorate, silver silicate and silver oxide, among which silver chloride and silver- nitrate are preferred.

Examples of the water soluble alkaline earth metal salts are the nitrate (e.g. magnesium nitrate, calcium nitrate and barium nitrate ) and sulfate (e.g. magnesium sulfate ). Such water soluble alkaline earth metal salts may be used, singly or in a combination of two or more, as water purifying material in a manner of supporting them on the activated carbon. Incidentally, the term "water soluble" means that the solubility of the salt in 100 g of distilled water at ambient temperature is 1 g or more.

In supporting the silver or inorganic silver compound (hereinafter, they are sometimes referred to as "silver component") and the water soluble alkaline earth metal salt (hereinafter, referred to as "water soluble salt component") on the activated carbon, an activated carbon is impregnated with both components by immersing the activated carbon in a solution or suspension of both components, which is prepared by dissolving or suspending both components in water or in an organic solvent and then dried followed, if necessary, by heat-treating, for example, at not higher than 350° C. Alternatively, the supporting may be achieved either by an immersing method or spraying method using both a solution or a suspension of the silver component and a solution or suspension of the water soluble salt component, and, if necessary, followed by drying and/or heat-treating at not higher than 350° C.

In case that an activated carbon is to be impregnated with a water insoluble silver component as a silver component, it is also possible, for example, that an aqueous solution of silver nitrate and that of sodium chloride are prepared separately, at first, one of them is impregnated into the activated carbon and then another is impregnated as well so that silver chloride is formed on the surface of pores of the activated carbon. Thus, two water soluble compounds may be added to the activated carbon separately whereby a compound which is hardly soluble in water is formed on the surface of the activated carbon.

By such treatment, the silver component and the water soluble alkaline earth metal salt are supported on the activated carbon. More specifically, it is considered that "supporting" is conducted on the surface of the activated carbons in pores existing in the carbon and/or the area among the particles thereof.

The amount of the silver component to the activated carbon is 0.05–0.5% by weight as silver, preferably 0.05–0.2% by weight as silver. When the amount of the silver component is too small, it may be that propagation of the bacteria in the water purifier cannot be well inhibited while, when it is too much, it may be that a large amount of bone-char is required for inhibiting an increased dissolution of silver.

The amount of the water soluble alkaline earth metal salt to be added to the activated carbon is 0.05–0.5% by weight as alkaline earth metal, preferably 0.05–0.2% by weight as alkaline earth metal.

Bone-char used in the present invention is that manufactured by known a method starting animal bone. Usually, it is prepared by crushing the bone, followed by defatting and carbonizing while being indirectly heated at 750°–950° C. Bone-char contains calcium phosphate (about 78 % by weight) as a main ingredient and its carbon content is about 9–11% by weight. Any bone-char may be used so far as its specific surface area is 90–120 m$^2$/g, mean pore radius is 90–120 angstrom, bulk density is 0.7–0.8 g/cm$^3$.

The water purifying material of the present invention contains the above-given activated carbon component as a main ingredient and, in actual use, the state wherein bone-char is homogeneously mixed with said activated carbon component is applied or, alternatively, the layers of activated carbon component and of bone-char may be laminated. Those layers may be successively laminated to give multilayered product with 4 to 10 layers. Further, the activated carbon component and/or bone-char may be used either solely or jointly by mixing them for preparing a fiber or sheet. The amount of the bone-char in the water purifying material of the present invention is usually 3–7% by weight or, preferably, 4–5% by weight. The water purifying material of the present invention may contain sepiolite. The amount of the sepiolite in the water purifying material is usually 3–7% by weight or, preferably, 4–5% by weight.

In conducting the purification of water using the water purifying material of the present invention, it is common to place the water purifying material in a purifier and then water is made to run therethrough. Alternatively, the water purifying material may be placed in water and allowed to stand for a while. The water purifiers are provided with a water inlet, a water outlet and a vessel portion for supporting a water purifying material between the inlet and the outlet. Commercially available purifiers can be used. The size of water purifiers can be appropriately selected in accordance with the amount of water to be treated. The water purifier usually houses 50 to 1000 cc of the water purifying material. The portion for housing the material is not necessarily restricted to any specific configuration. The portion usually has a cylindrical configuration, with the ratio of height to diameter being 1.0 to 5.0, or preferably 1.3 to 3.0. When a water purifying material in which the activated carbon component and bone-char are successively multilaminated is used, it is recommended that water is passed through the layers in the order of the activated carbon component layer and bone-char layer.

The water purifier using the water purifying material of the present invention can exert good water purifying efficiency and does not show propagation of bacteria for a long time after initiation of its use.

When the water purifying material of the present invention is used, for example, for purification of tap water, 100 g of the material is capable of purifying about 5 m$^3$ of water and, in most home kitchens, the material can be applicable usually for about one half year. Moreover, the silver concentration in the purified water is as small as several ppb and the value is far lower than the upper limit of silver in drinking water, 50 ppb, as regulated by World Health Organization.

The water purifying material of the present invention is useful not only for purification of drinking water but also for removal of bacteria from water used in the biotechnological field wherein certain microorganisms are to be propagated, for removal of bacteria from water used in the factories manufacturing LSI and the like and for prevention of putrefaction of stored water.

The present invention will be further illustrated by way of the following examples.

EXAMPLE 1

0.157 g of silver nitrate (0.1 g as silver) and 1.25 g (0.12 g as magnesium) of magnesium nitrate [Mg(NO$_3$)$_2$·6H$_2$O] were dissolved in 50 ml of distilled water. The solution was uniformly sprayed on 100 g of activated carbon and dried to give the treated activated carbon. This was mixed with 5.3 g of bone-char to give water purifying material (1).

The activated carbon used here and in the following examples is manufactured by activating coconut shell charcoal (particle size: 0.25–0.5 mm) which has 1530 m$^2$/g of specific surface area (N$_2$ adsorption BET method) and 0.430 g/cm$^3$ of bulk density. The bone-char used here and in the following examples has 0.25–0.50 mm of particle size, 113 m$^2$/g of specific surface area and 0.730 g/cm$^3$ of bulk density.

EXAMPLE 2

The same operations as in Example 1 were conducted with an exception that 0.7 g (0.17 g as calcium) of calcium nitrate [Ca(NO$_3$)$_2$] was used instead of 1.25 g of magnesium nitrate to give water purifying material (2).

EXAMPLE 3

The same operations as in Example 1 were conducted with an exception that 0.7 g (0.14 g as magnesium) of magnesium sulfate [MgSO$_4$] was used instead of 1.25 g of magnesium nitrate to give water purifying material (3).

EXAMPLE 4

The same operations as in Example 1 were conducted with an exception that 0.7 g (0.37 g as barium) of barium nitrate [Ba(NO$_3$)$_2$] was used instead of 1.25 g of magnesium nitrate to give water purifying material (4).

EXAMPLE 5

The same operations as in Example 1 were conducted with an exception that two components of 0.4 g of magnesium sulfate and 0.3 g of calcium nitrate (0.08 g as magnesium and 0.07 g as calcium) were used in a mixed state instead of 1.25 g of magnesium nitrate to give water purifying material (5).

EXAMPLE 6

0.157 g of silver nitrate (0.1 g as silver) and 1.25 g (0.12 g as magnesium) of magnesium nitrate [Mg(NO$_3$)$_2$·6H$_2$O] were dissolved in 50 ml of distilled water, uniformly sprayed on 100 g of activated carbon and dried to give the treated activated carbon. This was mixed with 3.1 g of bone-char to give water purifying material (6).

EXAMPLE 7

The same operations as in Example 6 were conducted with an exception that 7.5 g of bone-char was used to give water purifying material (7).

EXAMPLE 8

0.157 g of silver nitrate (0.1 g as silver) and 1.25 g (0.12 g as magnesium) of magnesium nitrate [$Mg(NO_3)_2 \cdot 6H_2O$] were dissolved in 50 ml of distilled water, the solution was uniformly sprayed on 100 g of activated carbon and dried to give the treated activated carbon. This was mixed with 3.5 g of bone-char and 4.5 g of sepiolite to give water purifying material (8).

EXAMPLE 9

Through a column having an inside diameter of 3.0 cm charged with 50 cc of water purifying material given in Example 1 tap water (chlorine concentration: 0.8 to 1.0 ppm, water temperature: 25° C.) was allowed to pass at 90 liter per hour.

The chlorine concentration (Co) at the inlet as well as the concentration (C) at the outlet were measured with the passage of time. The result showed that the amount of treated water was 2100 liters before the (C/Co) value became 0.2.

EXAMPLE 10

Through a column having an inside diameter of 6.0 cm charged with 300 cc of water purifying material given in Example 1 tap water (chlorine concentration: 0.8 to 1.0 ppm, water temperature: 25° C.) was allowed to pass at 540 liter per hour.

The chlorine concentration (Co) at the inlet as well as the concentration (C) at the outlet were measured with the passage of time. The result showed that the amount of treated water was 12600 liters before the (C/Co) value became 0.2.

COMPARATIVE EXAMPLE 1

0.157 g of silver nitrate (0.1 g as silver) was dissolved in 50 ml of distilled water, the solution was uniformly sprayed on 100 g of activated carbon having a particle size of 0.18 to 0.60 mm made from coconut shell, and dried to give the treated activated carbon. This was mixed with 17.6 g of bone-char to give a water purifying material (9).

COMPARATIVE EXAMPLE 2

The same operations as in Comparative Example 1 were conducted with an exception that the amount of the bone-char was changed to 5.3 g to give a water purifying material (10).

COMPARATIVE EXAMPLE 3

0.157 g of silver nitrate (0.1 g as silver) was dissolved in 50 ml of distilled water, the solution was uniformly sprayed on 100 g of activated carbon having an inside diameter of 0.18 to 0.60 mm made from coconut shell, and dried to give the treated activated carbon. This was mixed with 5.3 g of bone-char and of 0.6 g of calcium sulfate (0.18 g as calcium) to give a water purifying material (11).

1. Measurement of Dissolved Amount of Silver

Water purifying material (2.0 g) was placed in a 200 ml Erlenmeyer flask, 100 ml of distilled water was added, shaken at 25° C. for 1 hour and filtered. Silver concentration in the filtrate was measured by an atomic absorption spectrometer. The result is given in Table 1.

2. Measurement of Ability of Removal of Chlorine

The water purifying material (10 ml) was filled in a glass column of 1.5 cm inside diameter and water was passed therethrough at the following conditions.

Inlet $Cl_2$ concentration ($C_0$): 2.0 ppm
Water flow rate: 500 ml/min
Water temperature: 30° C.

The outlet chlorine concentration (C) was measured from time to time and the time required for arriving at $C/C_0=0.4$ (i.e. the time where the outlet chlorine concentration arrived at 0.8 ppm) was defined as the degree of removal of chlorine (expressed in hours). Measurement of chlorine was conducted by an o-tolidine absorptiometry. The result is given in Table 1.

3. Measurement of Antibacterial Action 100 ml of a tap water and 5.5 g of the water purifying material were placed in a 240 ml sterilized wide mouth bottle. Then 0.5 ml of bacteria solution (containing $5.0 \times 10^7$ cells/ml of Pseudomonas aeruginosa IFO 3080 and Escherichia coli IFO 3044) was added thereto, allowed to stand in a thermostat-controlled area at 25° C. for 24 hours and the numbers of living bacteria in the supernatant liquid were measured by a pour plate method (standard agar medium, 35° C., 48 hours). The result is given in Table 1.

TABLE 1

| Water-Purifying Material | Compound (wt. %) | | | | | dissolved amount of Ag (ppb) | ability of Removal Cl (hr) | viable cell number (cell/ml) |
| --- | --- | --- | --- | --- | --- | --- | --- | --- |
| | active carbon | bone-char | sepiolite | added component | | | | |
| Example 1 | 94.3 | 5 | — | $Mg(NO_3)_2$ as Mg | 0.7 0.11 | <10 | 3.1 | 0 |
| Example 2 | 94.3 | 5 | — | $Ca(NO_3)_2$ as Ca | 0.7 0.16 | <10 | 3.1 | 0 |
| Example 3 | 94.3 | 5 | — | $MgSO_4$ as Mg | 0.7 0.13 | <10 | 3.2 | 0 |
| Example 4 | 94.3 | 5 | — | $Ba(NO_3)_2$ as Ba | 0.7 0.35 | <10 | 3.0 | 0 |
| Example 5 | 94.3 | 5 | — | $MgSO_4 + Ca(NO_3)_2$ as (Mg + Ca) | 0.7 0.14 | <10 | 3.2 | 0 |
| Example 6 | 96.3 | 3 | — | $Mg(NO_3)_2$ as Mg | 0.7 0.12 | 25 | 3.5 | 0 |
| Example 7 | 92.4 | 7 | — | $Mg(NO_3)_2$ as Mg | 0.7 0.11 | <10 | 2.8 | 0 |
| Example 8 | 91.4 | 3.2 | 4.1 | $Mg(NO_3)_2$ as Mg | 0.6 0.09 | <10 | 2.8 | 0 |
| Comparative Example 1 | 85 | 15 | — | — | | 24 | 2.4 | 0 |
| Comparative Example 2 | 95 | 5 | — | — | | 64 | 3.2 | 0 |
| Comparative | 94.3 | 5 | — | $Ca(SO_4)$ | 0.6 | 48 | 3.1 | 0 |

TABLE 1-continued

| Water-Purifying Material | Compound (wt. %) | | | | dissolved amount of Ag (ppb) | ability of Removal Cl (hr) | viable cell number (cell/ml) |
| --- | --- | --- | --- | --- | --- | --- | --- |
| | active carbon | bone-char | sepiolite | added component | | | |
| Example 3 | | | | as Ca 0.17 | | | |

What is claimed is:

1. A process for purifying water which comprises contacting the water with a water-purifying material comprising (1) an activated carbon having (a) silver and/or an inorganic silver compound and (b) a water-soluble alkaline earth metal salt supported thereon and (2) a bone-char.

2. A water-purifying material comprising ( 1 ) an activated carbon having (a) silver and/or an inorganic silver compound and (b) a water-soluble alkaline earth metal salt supported thereon and (2 ) a bone-char.

3. The water-purifying material of claim 2 wherein the amount of the silver and/or inorganic silver compound to the activated carbon is 0.05–0.5% by weight calculated as metal.

4. The water-purifying material of claim 2 wherein the amount of the water-soluble alkaline earth metal salt to the activated carbon is 0.05–0.5% by weight calculated as metal.

5. The water-purifying material of claim 2 wherein the amount of the bone-char to the activated carbon is 3-7% by weight in the water-purifying material.

6. The water-purifying material of claim 2 wherein the inorganic silver compound is silver chloride, silver bromide, silver iodide, silver nitrate, silver sulfate, silver phosphate, silver sulfide, silver chlorate, silver silicate or silver oxide.

7. The water-purifying material of claim 2 wherein the inorganic silver compound is silver nitrate.

8. The water-purifying material of claim 2 wherein the water soluble alkaline earth metal salt is magnesium nitrate, calcium nitrate, barium nitrate or magnesium sulfate.

9. The water-purifying material of claim 2 further comprising sepiolite.

10. The water-purifying material of claim 9 wherein the amount of sepiolite is 3-7 % by weight in the water purifying material.

11. The water-purifying material of claim 2 wherein the water purifying material is made by a process which comprises supporting (a) silver and/or an inorganic silver compound and (b) a water soluble alkaline earth metal salt on an activated carbon, and mixing the resulting activated carbon with the bone-char.

12. The water-purifying material of claim 11 wherein the supporting of (a) the silver and/or the inorganic silver compound and (b) the water soluble alkaline earth metal salt on the activated carbon is achieved by spraying a solution or suspension of (a) silver and/or the inorganic silver compound and (b) the water soluble alkaline earth metal salt on the activated carbon.

* * * * *